United States Patent [19]

Gastaldo

[11] Patent Number: 4,518,730
[45] Date of Patent: May 21, 1985

[54] TRANSPARENT ANTIREFLECTION VARNISH FOR GLASS SUPPORTS, AND RELATED VARNISHING METHOD FOR GLASS VIDEO SCREENS

[75] Inventor: Giancarlo Gastaldo, Vestignè, Italy

[73] Assignee: Ing. C. Olivetti & C., S.p.A., Turin, Italy

[21] Appl. No.: 459,656

[22] Filed: Jan. 20, 1983

[30] Foreign Application Priority Data

Jan. 22, 1982 [IT] Italy ................................ 67062 A/82

[51] Int. Cl.$^3$ ................................................. C08K 5/54
[52] U.S. Cl. ..................................... 524/114; 524/188; 524/265
[58] Field of Search ......................... 524/114, 188, 265

[56] References Cited

U.S. PATENT DOCUMENTS

| 4,077,932 | 3/1978 | Columbus | 524/114 |
| 4,098,749 | 7/1978 | Hoshino | 524/114 |
| 4,167,537 | 9/1979 | Taniyama et al. | 525/443 |
| 4,168,332 | 9/1979 | Leinen et al. | 427/160 |
| 4,289,672 | 9/1981 | Friederich | 524/114 |
| 4,291,095 | 9/1981 | Chase | 524/114 |
| 4,305,863 | 12/1981 | Adachi | 524/265 |

FOREIGN PATENT DOCUMENTS 0090481  5/1983  European Pat. Off. .
1297488  5/1962  France .

*Primary Examiner*—Paul R. Michl
*Attorney, Agent, or Firm*—Banner, Birch, McKie & Beckett

[57] ABSTRACT

The varnish comprises a plasticizing resin, a diluent, a matting compound and an epoxy silane compound, this latter having excellent antireflection characteristics and enabling the varnish also to adhere to smooth glass. At the moment of use, a catalyst is added to the varish, the catalyst being an amino silane compound which causes the epoxy compound to polymerize, so that the varnish layer becomes resistant to abrasion and to chemical agents. The varnish can also be colored with aniline dyes such as aniline green and aniline yellow. On varnishing, the tube is first degreased, then varnished with several layers, and finally baked at a temperature of between 80° and 150° C. for a time sufficient to cause polymerization of the compound.

8 Claims, No Drawings

TRANSPARENT ANTIREFLECTION VARNISH FOR GLASS SUPPORTS, AND RELATED VARNISHING METHOD FOR GLASS VIDEO SCREENS

BACKGROUND OF THE INVENTION

This invention relates to transparent antireflection varnishes for glass supports, in particular cathode ray or television tube video screens.

These screens have the drawback of reflecting the surrounding light, especially if it derives from concentrated artificial light sources. To obviate this drawback it has been proposed to chemically etch the screen glass.

However, this method results in a polluting operation and is prohibited by law in various countries. It has also been proposed to cover the screen with a fabric mesh having a predetermined mesh width. However, these meshes on the one hand reduce the sharpness of the image, and on the other hand tend to collect dust thus gradually further impairing the image.

Finally, it has been proposed to varnish the screen with a transparent antireflection varnish. The varnishes known up to the present time have the drawback of poor adhesion to smooth glass, so that it has been proposed to carry out varnishing after suitably preparing the glass (for example by sanding or grinding). Moreover, know varnishes are scored on scratching, and are attacked by external agents, such as alcohol or other detergents or solvents in common use.

The technical problem of the invention is to create a varnish which on the one hand has a high transparency and good degree of anti-reflection, and on the other hand has high adhesion to smooth glass, high mechanical strength and is unattacked by commonly used detergents or solvents.

SUMMARY OF THE INVENTION

This technical problem is solved by the varnish according to the invention, which comprises a plasticising resin, a diluent and a matting compound, and is characterised in that the varnish further comprises a transparent material, namely a silane compound, which is able to adhere to smooth glass and to harden as a result of its polymerisation.

According to a further characteristic of the invention, the silane compound is an epoxy silane, and at the moment of use a catalyst is added to the varnish, this catalyst comprising an amino silane able to polymerise with the epoxy silane.

According to a further characteristic of the invention, the varnish comprises an aniline dye, and the diluent comprises a predetermined quantity of butylglycol.

These and further characteristics of the invention will be more apparent from the description given hereinafter of some preferred embodiments, and from the accompanying examples of formulations.

DETAILED DESCRIPTION

The varnish employed preferably comprises between 40 and 45% of a plasticiser in the form of an acrylic resin. The varnish also comprises a diluent mixture formed from methylethylketone (hereinafter known as MEK), this being a rapid action diluent, and a slow action diluent in the proportions of between 1/10 and 7/10 of this latter with respect to the MEK. The varnish also comprises a matting component consisting of polypropylene wax in the proportion of between 0.1 and 1%.

The principal element of the varnish is a transparent silane compound in the proportion of between 15 and 20%. This compound is able to adhere to smooth glass, and to harden as a result of polymerisation. Specifically, this compound can be gamma-glycidoxypropyltrimethoxysilane having the following chemical formula:

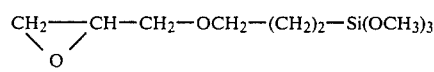

For example, the product known by the name of Silane Adhesion Promoter A 187 supplied by the firm Union Carbide can be used. This product is a very transparent liquid which is easily soluble in water, methanol, ethanol, acetone and many aliphatic esters. It easily adheres to the support, even if this is constituted by completely smooth lead glass. The properties of this product are:

| | |
|---|---|
| boiling point at 760 mm Hg | 290° C. |
| specific gravity at 25° C. | 1.00 |
| flash point | 135° C. |
| refraction index $n_D^{25}$ | 1.427 |

A catalyst is added to the varnish at the time of use, to polymerise the epoxy silane, thus improving its surface hardness characteristics. The polymer then becomes very hard and abrasion resistant. In particular, the catalyst is added in the proportion of between 26 and 33% of the varnish, and can be constituted by gamma-aminopropyltriethoxysilane of formula:

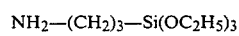

For example, the amino silane known by the name of Silane Adhesion Promoter A 1100 provided by the firm Union Carbide can be used, this being in the form of a colourless liquid easily soluble in benzene, methylcellosolve, chloroform, ethanol, heptane and toluene, and in water by hydrolysis.

The physical characteristics of this catalyst are the following:

| | |
|---|---|
| boiling point at 30 mm Hg | 123° C. |
| at 760 mm Hg | 217° C. |
| specific gravity at 25° C. | 0.94 |
| flashpoint | 104° C. |

For a colourless transparent varnish, the slow action diluent is constituted by butylcellosolve in the proportion of between 4 and 8% of the varnish, the MEK being used in the proportion of between 30 and 37%, and the polypropylene wax in the proportion of between 0.6 and 1%.

In the case of a coloured varnish, at least one aniline dye is added in the proportion of between 20 and 30%, while the diluent mixture is kept in the proportion of between 12 and 19%, and the slow action diluent is constituted by butylglycol.

Specifically, for a green based varnish, the dye comprises between 15 and 25% of aniline green and between 1 and 4% of aniline black. For an amber based varnish, the dye comprises between 15 and 25% of aniline yellow, between 1 and 4% of aniline black and between 4 and 10% of aniline orange.

In preparing the varnish, the various components are placed in a temperature-controlled vessel in the described percentages. The mixture is made homogeneous by stirring with a high speed mixer, for example of the Cawless type.

When this component predispersion stage has ended, the mixture is passed to a second mixer, for example of the micro-ball type, in order to optimise the mixing of the silanes and polypropylene wax with the acrylic resin. This operation is repeated twice, in order to stabilise the varnish product.

The product is then vibro-sieved on an appropriate filter, the purpose being to eliminate any impurities present in the mixture. The mixture prepared in this manner is closed in suitable containers sealed under vacuum.

Television tubes are varnished with the varnish according to the invention in the following manner.

The glass surface of the television tube to be varnished is firstly cleaned and degreased, using paper free from oily substances and soaked in a ketone solvent or ethyl alcohol. A properly amalgamated mixture of varnish and catalyst is then prepared, having substantially a Zan 2 viscosity of 12 sec and the following composition:
varnish: 100 g,
catalyst: 26–33 g,
MEK: 25 g.

A film of the varnish mixed in this manner is then deposited on the television tube surface either by brush or by a spray gun, in four crossed layers.

In the case of a spray gun, the air pressure is about 4 atm, the nozzle of diameter 1 mm, and the distance between the nozzle and glass about 20 cm.

The television tubes varnished in this manner are then baked for about one hour in an oven at a temperature of 100°–110° C. Satisfactory results have also been obtained with temperatures of between 80° and 150°, the baking time being varied correspondingly. The television tubes varnished in this manner have an antireflection of about 30 Gloss units and a transparency of between 80 and 88%.

The varnishing cycle for a television tube using the varnish according to the invention can be carried out either manually by successive stages, or in a continuous cycle plant in which the television tubes are fed into the various degreasing, solvent evaporation, varnishing, baking and cooling stations by means of a continuous conveyor.

The following tested examples illustrate particular compositions of the varnish according to the invention. The invention is not limited to these examples or to the described compositions, and can undergo modifications, substitutions and improvements without departing from the ambit of the invention.

EXAMPLE 1

A colourless varnish was prepared from a mixture having the following percentage composition:

| Component | Percentage |
| --- | --- |
| Epoxy silane A 187 | 17.5 |
| Acrylic resin | 41.8 |
| MFK | 34 |
| Butylcellosolve | 6 |

| Component | Percentage |
| --- | --- |
| Polypropylene wax | 0.4 |

This varnish was applied after adding 30% of Amino Silane A 1100 and approximately 20% of MEK. The television tubes treated in this manner had an antireflection of 30 Gloss units and a transparency of 88%. They were subjected to the following tests:
(1) In order to test the varnish adherence in a normal environment, cross chequering of 1 mm pitch was executed on the television tube, without any varnish becoming detached. When placed in a humidity chamber at 55° C. and 95% relative humidity, the television tube showed no blistering on the varnish after 120 hours.
(2) In order to test mechanical strength, the television tube was subjected to the Ericson Mod. 318 apparatus with a load of 150 g, without the appearance of any cracking due to scratching. It was also subjected to the action of a grinding wheel with a load of 250 g, to give only 0.018 mg of debris after 500 cycles.
(3) In order to test resistance to chemical agents, the television tube was treated with alcohol, MEK, acetone, isobutyl acid, citric acid, ammonia and perspiration without encountering any alteration. It was also subjected to continuous contact for 24 hours at ambient temperature by a ball point pen, pencil and nail varnish, then cleaned with alcohol and MEK, without leaving any residue.

EXAMPLE 2

A green transparent varnish was prepared from a mixture of the following percentage composition:

| Component | Percentage |
| --- | --- |
| Epoxy silane A 187 | 17.5 |
| Acrylic resin | 40.9 |
| MEK | 13.0 |
| Butylglycol | 6.0 |
| Polypropylene wax | 0.3 |
| Aniline green | 20.0 |
| Aniline black | 2.0 |

The varnish was applied with the addition of the catalyst as in the preceding case. When the varnished television tubes were subjected to the same tests as in the preceding case, they gave similar results, the transparency being 65%.

EXAMPLE 3

An amber transparent varnish was prepared from a mixture of the following percentage composition:

| Component | Percentage |
| --- | --- |
| Epoxy silane A 187 | 17.5 |
| Acrylic resin | 40.9 |
| MEK | 7.0 |
| Butylglycol | 5.0 |
| Polypropylene wax | 0.3 |
| Aniline yellow | 20.0 |
| Aniline orange | 8.0 |
| Aniline black | 2.0 |

The varnish gave results analogous to the preceding varnish.

I claim:

1. A transparent, antireflection varnish for a glass support comprising a plasticising acrylic resin, a diluent, a matting component, and an epoxy silane, wherein said epoxy silane is gamma-glycidoxpropyltrimethoxysilane present in an amount in the range of 15 to 20% by weight of the varnish and an amino silane catalyst is added to the varnish at the time of use to cause polymerization and hardening of the varnish, and wherein said acrylic resin is present in an amount in the range of 40 to 45% by weight of the varnish and said matting component is a polypropylene wax present in an amount in the range of 0.1 to 1% by weight of the varnish.

2. A transparent, antireflection varnish for a glass support comprising a plasticising acrylic resin, a diluent, a matting component, and an epoxy silane, wherein said epoxy silane is gamma-glycidoxpropyltrimethoxysilane present in an amount in the range of 15 to 20% by weight of the varnish and an amino silane catalyst is added to the varnish at the time of use to cause polymerization and hardening of the varnish, and wherein said diluent is a mixture of methyethylketone (MEK) as a rapid action diluent and a slow action diluent, the ratio of said slow action diluent to said MEK being in the range of 1:10 to 7:10.

3. The varnish of claim 1 or 2 wherein said amino silane catalyst is gamma-aminopropyltriethoxysilane in an amount in the range of 26 to 33% by weight of the varnish.

4. The varnish of claim 2 wherein said MEK is present in an amount in the range of 30 to 37% by weight of the varnish and said slow action diluent is butylcellosolve present in an amount in the range of 4 to 8% by weight of the varnish.

5. The varnish of claim 2 further comprising at least one aniline dye in an amount in the range of 20 to 30% by weight of the varnish.

6. The varnish of claim 5 wherein said slow action diluent is butylglycol and the ratio of said butylglycol to said MEK is in the range of 1:2 to 5:7.

7. The varnish of claim 5 wherein said aniline dye comprises 15 to 25% aniline green by weight of the varnish and 1 to 4% aniline black by weight of the varnish, and said diluent comprises approximately 13% MEK by weight of the varnish and approximately 6% butylglycol by weight of the varnish.

8. The varnish of claim 5 wherein said aniline dye comprises 15 to 25% aniline yellow by weight of the varnish, 1 to 4% aniline black by weight of the varnish and 4 to 10% aniline orange by weight of the varnish, and the diluent comprises approximately 7% MEK by weight of the varnish and approximately 5% butylglycol by weight of the varnish.

* * * * *